United States Patent Office 3,287,282
Patented Nov. 22, 1966

3,287,282
HYDROGEN ZEOLITE Y HAVING IMPROVED
HYDROTHERMAL STABILITY
Vernon E. Stiles, Fullerton, Calif., assignor to Union Oil
Company of California, Los Angeles, Calif., a corporation of California
No Drawing. Filed Dec. 7, 1962, Ser. No. 242,900
4 Claims. (Cl. 252—455)

This invention relates to new methods for the manufacture of certain synthetic, molecular sieve hydrogen zeolites of the Y crystal type having improved hydrothermal stability, and to the resulting novel compositions. The invention is particularly concerned with the manufacture of Y sieve hydrogen zeolites which, by virtue of their low sodium content and improved hydrothermal stability, are particularly useful as hydrocracking and isomerization catalyst bases. Briefly stated, the novel feature of the manufacturing process involves a combination of two critical steps, viz, (1) a post-aging step wherein the initially precipitated sodium form of the zeolite is allowed to age at relatively low temperatures in its mother liquor, and (2) an ion-exchange step wherein the aged sodium zeolite is digested with an aqueous solution of ammonium nitrate in order to exchange ammonium ions for the zeolite sodium ions. The resulting ammonium zeolite is then heated in a conventional manner to decompose the ammonium ions, thus forming the desired hydrogen zeolite. It is found that if the aging step is omitted, or if the ammonium nitrate ion-exchange step is replaced with the more conventional ion exchange with ammonium chloride, a hydrogen zeolite of much lower hydrothermal stability is obtained.

It has recently been discovered that certain zeolitic molecular sieves of the Y crystal type, in their ammonium form, can be heated at relatively high temperatures to decompose the ammonium ion, and that the resulting hydrogen zeolites (which are often referred to as being "decationized"), still exhibit a high degree of crystallinity and surface area, and have a relatively high acidity. These characteristics are in sharp contrast to the results obtained when other molecular sieve zeolites are similarly treated to form hydrogen zeolites; in the case of these other zeolites, e.g., zeolites of the X crystal type, the attempted conversion of the ammonium forms to hydrogen forms has always resulted in a complete collapse of the crystal structure with resultant marked decrease in surface area. As a result of their high acidity and surface area, the hydrogen zeolites of the Y crystal type have been found to be very useful as bases for catalysts to be employed in reactions such as hydrocracking or isomerization, which require a combination of a highly acid base with a hydrogenating component such as palladium, platinum or nickel.

One of the difficulties which has been encountered in using catalysts based on hydrogen Y zeolites resides in their relatively poor hydrothermal stability, i.e., their ability to retain crystallinity and surface area after contact with water or water vapor at high temperatures. Any substantial loss in surface area results in a corresponding decrease in catalytic activity. In the case of catalysts prepared from conventional hydrogen Y zeolites, wherein the sodium content ($Na_2O$) is less than about 3% by weight, it is often observed that there is an almost complete collapse of crystal structure upon hydration of the catalyst, followed by heating to drive off the water. The collapse in crystal structure is often accompanied by a decrease in surface area from figures in the neighborhood of 800–1,100 square meters per gram down to 20–100 square meters per gram. Losses in surface area of this magnitude are substantially fatal to continued catalyic activity.

Hydrothermal stability of catalysts is important in substantially any hydrocarbon conversion process, and particularly in processes where the catalyst is periodically regenerated by combustion of deactivating deposits. In any conversion process such as hydrocracking or isomerization, the catalyst may be inadvertently contacted with water, as by water-contaminated feedstocks or hydrogen supply, etc. Also, in the shipping of the catalyst, and loading of catalytic reactors, it is substantially impossible to avoid contacting the catalyst with moist air, and where the catalyst rapidly adsorbs water as in the present case, it may be in a substantially hydrated condition by the time it is loaded in the reactor. This water is subsequently desorbed during the heat-up or reaction period, and it is during this period that the greatest damage may occur. During regeneration, the catalyst is subjected to oxidation with air or oxygen-containing gases at relatively high temperatures of, e.g., 800-1,200° F., and since the combustible deposits on the catalyst normally include hydrocarbons, a considerable amount of water is generated by oxidation. Also, the input regeneration gases normally contain substantial amounts of water, unless expensive drying techniques are employed. It is obvious therefore, that in any commercial use of solid catalysts, it is important that they exhibit a high degree of hydrothermal stability.

It is known that a considerably higher degree of hydrothermal stability can be obtained in the case of hydrogen Y zeolites by only partially exchanging the sodium with ammonium ion, and then decomposing the sodium-ammonium zeolite to form a sodium-hydrogen zeolite containing, e.g., about 4–6% by weight of $Na_2O$. (As initially prepared, the sodium Y zeolite contains about 13–15% by weight of $Na_2O$.) However, although improved hydrothermal stability can be obtained by this means, it is found that when the removal of sodium is so incomplete that more than about 4–6% by weight of $Na_2O$ remains in the zeolite, the catalytic activity suffers greatly. Apparently, sodium in excess amounts results in neutralization of the active acidic centers on the catalyst. It would therefore be highly desirable to provide methods for maintaining hydrothermal stability in those hydrogen zeolite compositions containing less than about 4% by weight of $Na_2O$.

From the foregoing, it will be apparent that the main objective of the invention is to provide hydrothermally stable hydrogen zeolites of the Y crystal type which are also low in sodium content. A further object is to provide hydrocracking and isomerization catalysts of maximum activity and hydrothermal stability. Other objectives will be apparent from the more detailed description which follows.

In their sodium form, the general formula for the Y molecular sieve zeolites of this invention is expressed as follows:

$$0.9 \pm 0.2 Na_2O : Al_2O_3 : W SiO_2 : X H_2O$$

where $X = 0$ to about 9, and $W = 2.5$ to about 6. Sodium zeolites of this nature, and methods for their preparation are described in Belgian Patent Nos. 577,642, 598,582, 598,682, 598,683 and 598,686. The Y sieve zeolites having a $SiO_2/Al_2O_3$ mole-ratio of about 2.5 to 3.9 can be prepared by methods described in Belgian Patent No. 577,642, which in general involves digesting aqueous solutions of sodium silicate and sodium aluminate at elevated temperatures, following an initial low-temperature aging treatment. A more desirable form of the Y zeolite, having a $SiO_2/Al_2O_3$ mole-ratio of about 4 to 6, can be prepared by methods described in Belgian Patent No. 598,582, which involves essentially an initial, low-temperature aging of a mixture of silica hydrosol, sodium hydroxide and sodium aluminate, followed by a high-temperature digestion to effect crystallization of the sodium zeolite. Sodium zeolites prepared by either of these methods can be converted to crystalline hydrogen zeolites by ammonium ion-exchange followed by heating, although the high-silica type of zeolite is generally more stable in its hydrogen form than the hydrogen zeolites prepared from the low-silica zeolites. In either case however the resulting hydrogen zeolites are deficient in hydrothermal stability, even though the initial preparations may exhibit a high degree of crystallinity and surface area.

In the above preparations, when the major source of silica is sodium silicate, the operative mole-ratios of reactants fall within the following ranges:

TABLE 1

|  | Range 1 | Range 2 | Range 3 |
|---|---|---|---|
| $Na_2O/SiO_2$ | 0.6–1.0 | 1.5–1.7 | 1.9–2.1 |
| $SiO_2/Al_2O_3$ | 8–30 | 10–30 | 10–12 |
| $H_2O/Na_2O$ | 12–90 | 20–90 | 40–90 |

When the major source of silica is a silica hydrosol, the operative mole-ratios of reactants fall within the following approximate ranges:

TABLE 2

|  | Range 1 | Range 2 | Range 3 |
|---|---|---|---|
| $Na_2O/SiO_2$ | 0.2–0.4 | 0.4–0.6 | 0.6–0.8 |
| $SiO_2/Al_2O_3$ | 8–40 | 10–30 | 7–30 |
| $H_2O/Na_2O$ | 25–60 | 20–60 | 20–60 |

When Y sieve zeolites of maximum purity and highest $SiO_2/Al_2O_3$ ratios are desired (e.g., in the range of 4 to 6), silica hydrosol is used as the major source of silica, and the preferred mole-ratios of reactants are as follows:

TABLE 3

|  | Range 1 | Range 2 |
|---|---|---|
| $Na_2O/SiO_2$ | 0.28–0.30 | ca. 0.4 |
| $SiO_2/Al_2O_3$ | 8–10 | 10–27 |
| $H_2O/Na_2O$ | 30–50 | 30–50 |

In all the above preparations, there is an initial aging or "seeding" during which the aqueous mixtures are allowed to stand at relatively low temperatures of, e.g., 0–40° C. for 1–60 hours, followed by a high temperature period of digestion during which the mixtures are maintained at a temperature of about 80–110° C. for about 12–60 hours, during which precipitation of the crystalline sodium zeolite occurs. In the past it has been the practice to filter off the sodium zeolite at the end of the high temperature digestion period, wash out soluble salts, and then proceed with conversion of the sodium zeolite to other desired forms such as the hydrogen zeolite by suitable ion-exchange procedures. It has now been found however that this high temperature digestion period should be followed by a relatively low temperature post-aging period, during which the precipitated sodium zeolite is allowed to remain in the mother liquor for about 4–48 hours at a temperature of about 0–79° C., preferably about 10–40° C. When this final low-temperature aging is omitted, products of the desired hydrothermal stability are not obtained.

The "decationized," or hydrogen form of the Y zeolites can be prepared by subjecting the corresponding sodium zeolite to ion-exchange with an aqueous solution of substantially any soluble ammonium salt. In the present case, however, it is found that the use of ammonium nitrate is critical to obtain maximum hydrothermal stability. Procedurally, the ion-exchange can be carried out either continuously or batch-wise by simply contacting the hydrous sodium zeolites with aqueous solutions of ammonium nitrate of, e.g., 1–20 molar concentration, preferably at elevated temperatures of about 50–100° C. In continuous operations, the ammonium nitrate solution is percolated through a bed of the sodium zeolite until the desired degree of ion-exchange has taken place. In batch operations it is preferable to employ several stages, wherein the sodium zeolite is first agitated with a batch of ammonium nitrate solution, then filtered off and contacted with a fresh ammonium nitrate solution. Ordinarily about 3–6 stages of contacting are desirable. In any case, the ion-exchange is terminated when the $Na_2O$ content of the zeolite has been reduced to below about 4% by weight, and preferably between about 1% and 3%. This means that, for acceptable activity, more than about 60% of the zeolitic sodium should be removed and replaced with ammonium ion; and that preferably about 10–25% of the original sodium is allowed to remain in the zeolite in order to maintain maximum hydrothermal stability.

Following the ion-exchange step, the ammonium zeolite is filtered, washed and dried, and then calcined at about 700–900° F. for about 0.5 to 3 hours, in order to convert the ammonium zeolite to the hydrogen zeolite. Compositions prepared in this manner ordinarily display an initial surface area in the range of about 800–1,100 square meters per gram.

Hydrothermal stability of the compositions prepared as above described is measured herein by rehydrating the hydrogen zeolites in moist air at room temperature until they are substantially saturated, and then recalcining for 12 hours at 900° F. Surface area is then measured again, and the difference between the initial surface area and the area after recalcining is taken as a measure of hydrothermal stability.

The hydrogen zeolites prepared as described herein possess the required acid function for cracking and isomerization activity. For purposes of hydrocracking or hydroisomerization, it is necessary to incorporate a minor proportion of a suitable metal hydrogenating component, e.g., a Group VIII metal. The preferred hydrogenating metals comprise the Group VIII noble metals, and particularly palladium, platinum or rhodium. To incorporate these metals by ion-exchange, the zeolite in its ammonium form, before being converted to the hydrogen form, is digested with an aqueous solution of a suitable compound of the desired metal wherein the metal is present in a cationic form. This procedure is described more specifically in Belgian Patent No. 598,686. The metal-ammonium zeolite is then subjected to final calcining and activation in order to convert the remaining ammonium ions to hydrogen ions.

The finished catalysts are useful for the hydrocracking of mineral oil fractions boiling between about 300–1,000° F., to produce desired lower boiling hydrocarbons, e.g., gasoline, jet fuel, etc. Suitable hydrocracking conditions for catalyst compositions containing about 0.2 to 1% by weight of palladium or platinum, fall within the following ranges:

TABLE 4

|  | Operative | Preferred |
|---|---|---|
| Temperature, ° F. | 400–850 | 500–750 |
| Pressure, p.s.i.g. | 300–5,000 | 750–2,000 |
| LHSV | 0.1–10 | 0.5–5 |
| $H_2$/oil ratio, SCF/B | 1,000–20,000 | 2,000–12,000 |

The following examples are cited to illustrate the invention, but are not to be construed as limiting in scope:

EXAMPLE I (A) *Preparation of sodium zeolite.*—Into a large vessel containing 1,422 ml. of distilled water was stirred 100.4 grams of Nalco sodium aluminate. To this solution was then added 278 grams of sodium hydroxide, and the solution was allowed to cool to 98° F. About 1,989 grams of colloidal silica hydrosol ("Ludox"—about 30.6 weight-percent $SiO_2$), was then added rapidly while stirring the solution violently. The resulting slurry was then set aside to age at room temperature for 27 hours. The mole-ratios of reactants in the mixture were as follows:

Na$_2$O/SiO$_2$ _____ 0.4
SiO$_2$/Al$_2$O$_3$ _____ 20
H$_2$O/Na$_2$O _____ 40

At the end of the 27-hour aging period, the mixture was then heated to about 200–205° F., and maintained at that temperature for about 48 hours, during which crystallization occurred. The resulting mixture was then divided into two approximately equal portions, and one portion was filtered hot and the filter cake set side for subsequent treatment to be described in Example II. The other portion of the slurry was set aside and allowed to age at room temperature for about 24 hours. This aged portion was then filtered, washed with hot water, and a portion subjected to analysis showed 14.1 weight-percent Na$_2$O, on a dry basis.

(B) *Ion-exchange with ammonium nitrate.*—About 420 grams of the wet, post-aged sodium zeolite from part (A) was stirred and heated with 400 ml. of 8 molar ammonium nitrate solution for about 1 hour. The slurry was then filtered and the filter cake rinsed three times with hot water. This ion-exchange procedure was then repeated twice again, and the resulting ammonium zeolite was then found to contain only 2.2 weight-percent of Na$_2$O, indicating that about 85% of the original sodium had been replaced with ammonium ions.

The ammonium zeolite was then dried and calcined at 800° F. and was found to have a surface area of 860 square meters per gram.

Upon rehydrating the calcined hydrogen zeolite to constant weight, and then recalcining at 80–900° F. for 4 hours and then at 900° F. for 12 hours, the zeolite was found to have a surface area of 582 square meters per gram. The loss in surface area was thus only about 32%; 68% of the original surface area was retained through the hydration and recalcination procedure.

EXAMPLE II

The remaining portion of sodium zeolite from part (A) of Example I (which had not been subjected to the post-aging treatment, and which contained 15.9 weight-percent Na$_2$O) was subjected to three batch ion-exchange treatments with aqueous ammonium nitrate, substantially as described in part (B) of Example I, and the resulting ammonium zeolite was found to contain about 2.5 weight-percent Na$_2$O. Thus, about 84% of the original sodium had been replaced with ammonium ion. Upon calcining at 800° F., this ammonium zeolite was converted to a hydrogen zeolite having a surface area of 899 square meters per gram. Upon rehydration and recalcining as described in Example I(B), the surface area was found to be 334 square meters per gram. Thus, in this example, the omission of the post-aging treatment resulted in a loss of about 63% of the original surface area. This example therefore demonstrates that ion-exchange with ammonium nitrate does not give maximum hydrothermal stability if the post-aging treatment is omitted.

EXAMPLE III

A portion of the sodium zeolite from part (A) of Example I, which had undergone the low temperature post-aging treatment, was subjected to a series of three batch ion-exchange treatments with 8 molar ammonium chloride solution, the procedure being substantially the same as that used in Example I(B) with the ammonium nitrate ion exchange. The resulting ammonium zeolite, after exhaustive washing to remove chloride ion, was found to contain 2.4 weight-percent Na$_2$O, thus showing that here again about 85% of the original sodium had been replaced with ammonium ion. Upon drying and calcining this ammonium zeolite to convert it to the hydrogen zeolite, the surface area was 930 square meters per gram. Upon rehydrating and recalcining the hydrogen zeolite, the surface area was found to be only 270 square meters per gram. Thus, in this example about 81% of the original surface area had been lost, thus demonstrating that the post-aging treatment does not alone suffice to preserve maximum hydrothermal stability, when ammonium chloride is used to prepare the ammonium zeolite.

EXAMPLE IV

To prepare an active hydrocracking catalyst for use herein, the procedure of Example I is modified as follows:

Immediately after the ammonium ion exchange step in part (B), and before the ammonium zeolite is converted to the hydrogen zeolite, a portion of the ammonium ion is exchanged for palladium by digesting the ammonium zeolite with an aqueous solution of tetrammine palladium chloride, resulting in the deposition of about 0.5 weight-percent of palladium on the zeolite. The resulting palladium-ammonium zeolite is then calcined as described in Example I, to produce the active hydrogen form of the palladium catalyst.

The catalyst prepared as above described can be employed in an exemplary hydrocracking process wherein a 400–800° F. boiling range gas oil is hydrocracked at 1,000 p.s.i.g., 1.5 LHSV, about 500–520° F. and using 8,000 s.c.f. of hydrogen per barrel of feed. Under these conditions a conversion to 400° F. end-point gasoline of about 50–60% by volume is obtained. Such catalyst can be repeatedly regenerated with much less loss in surface area and activity than when using a similar catalyst prepared without the combination of the low temperature post-aging treatment and ammonium nitrate ion-exchange.

It is not intended that the invention should be limited to the details described above since many variations may be made by those skilled in the art without departing from the scope or spirit of the following claims:

I claim:

1. A method for the manufacture of a relatively hydrothermally stable hydrogen zeolite of the Y crystal type, having a SiO$_2$/Al$_2$O$_3$ mole-ratio between about 4 and 6, which comprises:

(A) forming a mixture comprising water, sodium aluminate, sodium hydroxide and silica hydrosol, said mixture having a molar composition within one of the following ranges:

|  | Range 1 | Range 2 | Range 3 |
|---|---|---|---|
| Na$_2$O/SiO$_2$ | 0.2–0.4 | 0.4–0.6 | 0.6–0.8 |
| SiO$_2$/Al$_2$O$_3$ | 8–40 | 10–30 | 7–30 |
| H$_2$O/Na$_2$O | 25–60 | 20–60 | 20–60 |

(B) aging said mixture at about 0–40° C. for about 1–60 hours;
(C) digesting the aged mixture at about 80–110° C. for about 12–60 hours to produce a crystalline sodium zeolite-mother liquor mixture.
(D) allowing said sodium zeolite-mother liquor mixture to age at a temperature between about 10–40° C. for about 4–48 hours;
(E) separating said sodium zeolite from its mother liquor;
(F) contacting the separated sodium zeolite with an aqueous solution of ammonium nitrate to replace by ion-exchange at least about 60% of the zeolitic sodium ions with ammonium ions, thus forming an ammonium zeolite; and
(G) calcining said ammonium zeolite in order to produce the specified hydrogen Y zeolite.

2. A process as defined in claim 1 wherein said ammonium ion-exchange treatment is controlled so as to replace at least about 75%, and not more than about 90%, of the zeolitic sodium ions with ammonium ions.

3. A hydrogen zeolite of the Y crystal type having a SiO$_2$/Al$_2$O$_3$ mole-ratio of between about 4 and 6, and containing between about 1% and 4% by weight of $Na_2O$, said zeolite having been prepared by the process defined in claim 1.

4. A catalyst composition having useful hydrocracking activity comprising (1) a major proportion of a hydrogen zeolite of the Y crystal type as defined in claim 3, and (2) a minor proportion of a Group VIII noble metal hydrogenation component.

References Cited by the Examiner

UNITED STATES PATENTS

| | | | |
|---|---|---|---|
| 2,971,903 | 2/1961 | Kimberlin et al. | 252—455 |
| 2,971,904 | 2/1961 | Gladrow et al. | 252—455 |
| 2,979,381 | 4/1961 | Gottstine et al. | 23—113 |
| 3,130,006 | 4/1964 | Rabo et al. | 23—112 X |
| 3,130,007 | 4/1964 | Breck | 23—113 |
| 3,132,087 | 5/1964 | Kelley et al. | 208—60 |
| 3,140,251 | 7/1964 | Plank et al. | 208—120 |

FOREIGN PATENTS 785,132   10/1957   Great Britain.

OSCAR R. VERTIZ, *Primary Examiner.*

MAURICE A. BRINDISI, *Examiner.*

E. J. MEROS, *Assistant Examiner.*